UNITED STATES PATENT OFFICE.

WILLIAM J. CLAPP, OF NANTYGLO, COUNTY OF MONMOUTH, AND THOMAS GRIFFITHS, OF BLAENAVON, COUNTY OF MONMOUTH, ENGLAND.

COMPOUND FOR USE IN THE MANUFACTURE OF LININGS, PLUGS, AND TUYERES FOR FURNACES AND CONVERTERS, &c.

SPECIFICATION forming part of Letters Patent No. 261,430, dated July 18, 1882.

Application filed March 7, 1882. (No specimens.) Patented in England March 28, 1881, No. 1,372.

*To all whom it may concern:*

Be it known that we, WILLIAM JOHN CLAPP, surgeon, and THOMAS GRIFFITHS, subjects of the Queen of Great Britain, residing respectively at Nantyglo and Blaenavon, both in the county of Monmouth, England, have invented an improved material or compound to be used in the manufacture of linings, plugs, and tuyeres for furnaces and converters employed in the manufacture of iron, steel, and other metals, (for which we have received Letters Patent in Great Britain, No. 1,372, dated 28th March, 1881;) and we do hereby that the following is a full, clear, and exact description of the invention, which will enable others skilled in the art to which it appertains to make and use the same.

The invention has for its object the production of an improved material or compound to be used in the manufacture of linings, plugs, and tuyeres for furnaces and converters employed in the manufacture of iron and steel and other metals. For this purpose we make a strong solution of powdered borax and burnt alum, the borax and alum being in excess—that is to say, after the water is mixed with the borax and alum the mixture must be allowed to stand for some time, and if the quantity of water takes up the whole of the borax and alum more of the latter materials must be added, so that they shall be in excess. We then take a sufficient quantity of graphite, fire-clay, or other brick material, according to the quantity of compound required, and after well mixing the same with the solution we add as much pure asbestus as will form a solid workable mass. Then it is to be kneaded or worked and shaped by being pressed in suitable molds to form plugs and tuyeres; or, if required to form the lining of furnaces and converters, it is rammed in position, after which it is allowed to dry, and is then fired in the same manner as fire-brick.

Linings, plugs, and tuyeres formed of this improved compound or material will be found capable of resisting the action of fire for a much longer period than when such articles are formed of the materials heretofore in use.

The strong solution of borax and alum entering into our compound serves to bind or cement the refractory materials so intimately together that the lining remains intact and firm for a greater period of time than if a flux were used, which sets only under the heat of the fire in which the lining is placed.

We are aware that asbestus has heretofore been combined with fire-clay and other refractory materials to form a lining for furnaces, and disclaim the broad use thereof.

Having thus described the nature of our said invention and the mode in which we carry the same into effect, we would have it understood that what we claim is—

The refractory compound herein described, consisting of a strong solution of borax and alum, asbestus, graphite, or fire-clay or other brick material, as and for the purpose herein set forth.

W. J. CLAPP.
     THOS. GRIFFITHS.

Witnesses:
 S. WILLIAMS,
  *Newport, Mon.,*
 A. WINMILL,
  *Clerks to G. W. Jones Heard & Co.*